(12) United States Patent
Breguet et al.

(10) Patent No.: US 11,191,615 B2
(45) Date of Patent: Dec. 7, 2021

(54) ENDODONTIC INSTRUMENT, IN PARTICULAR FOR REAMING A ROOT CANAL

(71) Applicant: FKG DENTAIRE S.A., La Chaux-de-Fonds (CH)

(72) Inventors: Olivier Breguet, Le Locle (CH); Gianluca Rosato, La Chaux-de-Fonds (CH)

(73) Assignee: FKG DENTAIRE S.A., La Chaux-de-Fonds (CH)

( * ) Notice: Subject to any disclaimer, the term of this patent is extended or adjusted under 35 U.S.C. 154(b) by 0 days.

(21) Appl. No.: 14/774,253

(22) PCT Filed: Mar. 10, 2014

(86) PCT No.: PCT/CH2014/000028
§ 371 (c)(1),
(2) Date: Nov. 13, 2015

(87) PCT Pub. No.: WO2014/139039
PCT Pub. Date: Sep. 18, 2014

(65) Prior Publication Data
US 2016/0067012 A1  Mar. 10, 2016

(30) Foreign Application Priority Data
Mar. 12, 2013 (CH) .......................... 586/13

(51) Int. Cl.
*A61C 5/42* (2017.01)
(52) U.S. Cl.
CPC ..................... *A61C 5/42* (2017.02)

(58) Field of Classification Search
CPC ......... A61C 5/023; A61C 5/025; A61C 1/082; A61C 1/14; A61C 1/084; A61C 19/02; A61C 3/02; A61C 8/0089; A61C 5/42
(Continued)

(56) References Cited

U.S. PATENT DOCUMENTS 4,443,193 A  4/1984 Roane
5,947,730 A  9/1999 Kaldestad
(Continued)

FOREIGN PATENT DOCUMENTS

CH  686 026 A5  12/1995

OTHER PUBLICATIONS

International Search Report Corresponding to PCT/CH2014/000028 dated Jun. 23, 2014.

*Primary Examiner* — Heidi M Eide
*Assistant Examiner* — Drew S Folgmann
(74) *Attorney, Agent, or Firm* — Finch & Maloney; Michael J. Bujold; Jay S. Franklin

(57) ABSTRACT

An instrument (10) having a working section (11) that terminates in an end zone (12) having a pointed tip. The end zone (12) has, on the one hand, a conical guiding section (13) which ends in a tip. This guiding section (13) has a tip angle of between 10° and 60° and, on the other hand, an angular cutting section (14) adjacent to the conical guiding section (13) which has three cutting edges (15). The angular cutting section (14) extends over a certain length and is located intermediate between the conical guiding section (13) and the working section (11). The angular cutting section (14) has a cross-section that progressively increases from the base of the conical guiding section (13) over at least a portion of its length.

10 Claims, 10 Drawing Sheets

(58) Field of Classification Search
USPC .......................................... 433/81, 102, 224
See application file for complete search history.

(56) References Cited

U.S. PATENT DOCUMENTS

| | | | | |
|---|---|---|---|---|
| 6,702,579 B1 * | 3/2004 | Hoppe | ..................... | A61C 5/42 |
| | | | | 433/102 |
| 7,311,522 B2 * | 12/2007 | Graybill | ................... | B23H 5/06 |
| | | | | 433/102 |
| 7,435,086 B2 * | 10/2008 | Berutti | ..................... | A61C 5/42 |
| | | | | 433/102 |
| 7,481,652 B2 * | 1/2009 | Senia | ....................... | A61C 5/42 |
| | | | | 433/102 |
| 2015/0056032 A1 * | 2/2015 | Scianamblo | ........ | B23B 51/0081 |
| | | | | 408/1 R |

* cited by examiner

ENDODONTIC INSTRUMENT, IN PARTICULAR FOR REAMING A ROOT CANAL

This application is a National Stage completion of PCT/CH2014/000028 filed Mar. 10, 2014, which claims priority from Swiss patent application serial no. 586/13 filed Mar. 12, 2013.

FIELD OF THE INVENTION

The present invention concerns an endodontic instrument, in particular for reaming out a root canal of a patient's tooth, the instrument having a working section that terminates in an end zone in the shape of a conical tip having a dual function, namely both of guiding the instrument during its movement into the root canal and cutting out organic material in order to clean and prepare the root canal for a subsequent treatment, known as root treatment.

BACKGROUND OF THE INVENTION

The cleaning and shaping of root canals of a tooth intended to receive filling substances are carried out by means of reaming instruments that have an active portion, called a working section, whose purpose is to shape, carve out and clean the inside walls of the root canal in order to prepare it to receive the treatment and filling materials so as to prevent any accumulation of oxygen in the canal, which would be likely to promote bacterial growth in the tooth.

However, it is essential for the practitioner to have an instrument capable of conforming to the root canal so as to treat the walls without deviating relative to the direction of the canal, whatever the shape of the latter. Now, conforming to the root canal is essentially related to the guiding characteristics of the end zone and more specifically the geometry of the tip. Nevertheless, whereas the guiding is an essential function, the machining of the canal walls is also an essential function, so it is imperative for the end zone and in particular the tip to be so shaped as to be able to effectively fulfill these two functions, namely the guiding and the cutting. Next comes the removal of material effected by the working section of the instrument, which is an extension of the end zone and which, as is known, has the functions of cutting, machining the walls of the root canal and clearing away the material removed during the machining.

In practice the preparation of the canal is carried out using a range of instruments all of which have the characteristics of guiding in the end zone and those of cutting and clearing away the material removed in the working zone. The practitioner usually begins the preparation of the canal with an instrument whose nominal diameter fits the initial diameter of the tooth canal, then he replaces the first instrument with an instrument of the same type but having a larger nominal diameter, and so on, progressively increasing the cross-sections of the instruments.

Most of the existing instruments have a guiding tip which has no cutting function, so it is necessary to use a range of instruments whose diameters increase very gradually, for example in steps of 0.05 mm, and this entails having a sequence of six instruments for the practitioner if he has to progress from an entry diameter of 0.10 mm to 0.40 mm. Unless that procedure is adhered to, the risk of breaking the instrument inside the canal considerably increases.

However, there are instruments said to have an active tip which make it possible, with a cutting effect at the center, to penetrate into a canal of very small size. But according to their instructions for use, such instruments should be used exclusively for reprocessing operations and solely in the straight part of the canal. Utilization in a curved portion of the canal would automatically result in perforation of the canal wall.

Among previous publications American patent U.S. Pat. No. 5,947,730 A (KALDESTAD ROY N) can be cited, which describes a range of instruments whose purpose is to treat a root canal of a tooth and which are characterized in that their tip is specifically "non-cutting". The instrument according to the invention is designed to solve the dual technical problem that besets instruments designed for machining the root canal, namely those capable of conforming to the existing canal, i.e. on the one hand being guided by the walls of the canal while avoiding the hollowing out of secondary cavities, and on the other hand being capable of cleaning the existing canal by eliminating the debris it contains and scraping the walls without perforating them. This instrument of the prior art cannot perform both these operations since it is considered to have a "non cutting tip", which deprives it of any possibility of fulfilling the functionalities that characterize the instrument of the present invention.

The instrument described in American patent U.S. Pat. No. 4,443,193 A (ROANE JAMES B) is designed essentially to perform a cutting function and it is for this reason that, as shown in particular by FIG. 3, the cutting points are at the bottom of the attachment identified by the index 44, namely the point farthest away from the tip, and therefore in a peripheral position that is remote relative to the tip of the instrument. Granted that the instrument of the invention has a dual function of guiding and cutting, the guiding must have priority during penetration into the canal in order to avoid perforating the walls of the canal and hollowing out a secondary canal which does not correspond to the natural canal.

The instrument corresponding to Swiss patent CH 686 026 (MAILLEFER INSTRUMENTS SA) has a single function, namely easier penetration into the root canal. The means for achieving that objective is to produce a tip having a very acute angle, at any rate more acute than the usual ones. Penetration is facilitated, but the preparation of the canal is complicated and made slower. To compensate for that effect, the practitioner is compelled to use a larger number of instruments in the range, knowing that each of these instruments in the same range, used in succession and having increasing cross-sections, can each only have a limited action.

By virtue of its design the instrument of the present invention on the one hand allows correct guiding that avoids deviations from the shape of the canal, which makes it possible for the practitioner to avoid the necessity of using an unduly large number of instruments with increasing cross-sections and to use only a limited number of instruments of the same range, and on the other hand to cut out correctly the material obstructing the root canal with a view to preparing the canal for subsequent treatment, in particular filling in the context of a root treatment operation. This instrument, with its universal character, ensures that the practitioner will save time, minimize the risks and increase comfort for the patient.

SUMMARY OF THE INVENTION

The present invention proposes to provide an instrument that responds essentially to these two complementary requirements, namely ensuring the guiding of the instrument during penetration into the root canal and at the same time cutting at the level of the walls, while conforming to the configuration, i.e. following the curvatures of the canal.

This objective is achieved by the endodontic instrument according to the invention for reaming root canals, as defined earlier and characterized in that the end zone has the general shape of a cone comprising on the one hand an end section called the guiding section with smooth sides, which ends at a rounded tip, and on the other hand a sharp section called the cutting section positioned behind the guiding section and having at least one cutting edge, the cutting section being intermediate between the guiding section and the working section.

Advantageously, the end zone in the shape of a conical tip has an apex angle substantially between 10° and 60°.

Preferably, the at least one cutting edge of the cutting section forms an angle of between 10° and 60° relative to the longitudinal axis of the instrument, over at least part of the cutting section.

In a preferred embodiment the cutting section has a number of cutting edges distributed around the periphery of the cutting section.

The angel of the tip of the guiding section is preferably larger than the angle formed by the cutting edges with the central axis of the instrument over at least part of their length.

Advantageously, the nominal diameter of the instrument, defined as the diameter of the working section, is larger than the effective cutting diameter, defined as the diameter of the junction zone between the base of the guiding section and the cutting section.

The angle at the tip of the guiding section is advantageously between 15° and 55° instrument.

The effective cutting diameter is preferably essentially equal to 0.10 mm.

The cutting edges are advantageously arranged regularly at the periphery of the instrument; in particular when the cutting section has three cutting edges which, as viewed in cross-section, are positioned at the three apexes of an equilateral triangle; or when the cutting section has four cutting edges, which as viewed in cross-section, are positioned at the four corners of the square.

BRIEF DESCRIPTION OF THE DRAWINGS

The present invention and its advantages will be better understood on reading the detailed description of preferred embodiments of the device, with reference to the attached drawings which are presented for indicative and non-limiting purposes, and in which.

DETAILED DESCRIPTION OF THE PREFERRED EMBODIMENTS

Figure 1A:
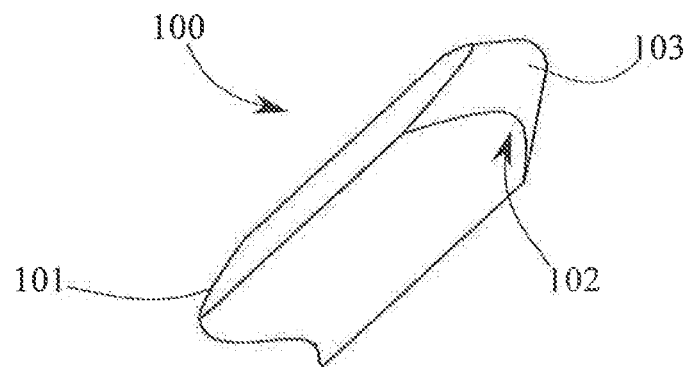
FIGS. 1A, 1B and 1C show a perspective view, a longitudinal section and a transverse cross-section of an embodiment of an instrument of the prior art.
Figure 1B:
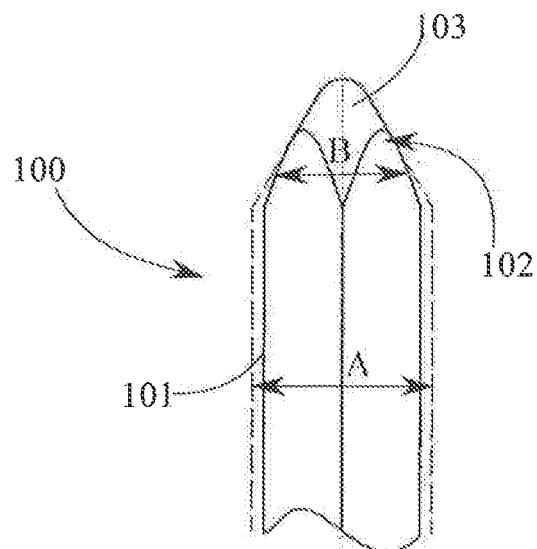
Figure 1C:
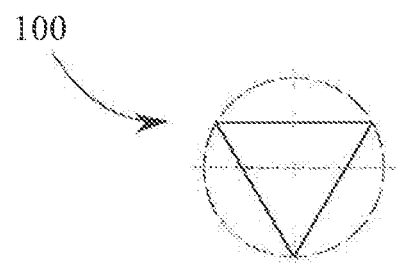

Referring to FIGS. 1A, 1B and 1C, the endodontic instrument 100 for reaming out a patient's tooth, with a view to reaming Out root canals, comprises a working section 101 that terminates in an end zone 102 of substantially conical shape with a tip having a blunt point 103. The end zone 102 has the shape of a cone with the apex angle essentially between 10° and 60°. For the use of this type of instrument the following magnitudes are decisive: the nominal diameter A, which is the diameter of the circle that circumscribes a cross-section of the instrument at the level of the working section 101; the optimum cutting diameter B, which corresponds to the diameter of the cross-section in the smooth, conical end of the guiding section 13 terminates and where the cutting edges of the cutting section 14 begin; and the initial diameter D of the root canal (see FIG. 3), which is the entry diameter into the said root canal.

Figure 2A:
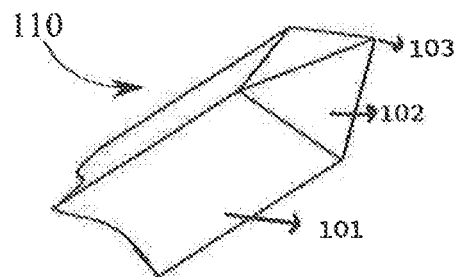
FIGS. 2A, 2B and 2C show a perspective view, a longitudinal section and a transverse cross-section of a second embodiment of an instrument of the prior art.
Figure 2B:
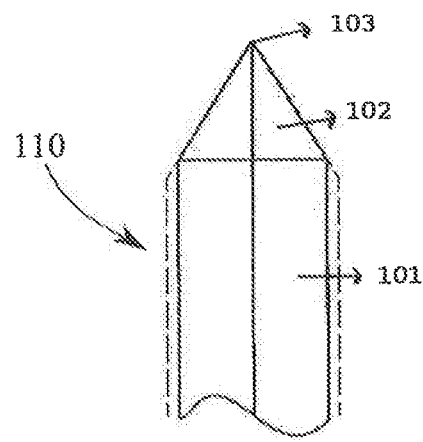
Figure 2C:
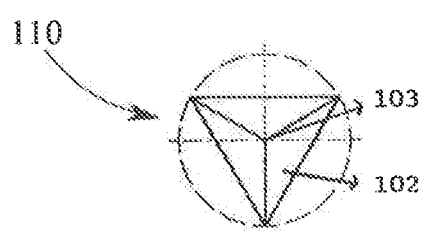

FIGS. 2A, 2B and 2C show views similar to the previous ones, but in which the instrument 110 has a conical point which is not blunt such that the cutting edges extend up to the end of the instrument, which suppresses the guiding effect of the tip and makes the instrument dangerous in curved parts of a root canal.

Figure 3:
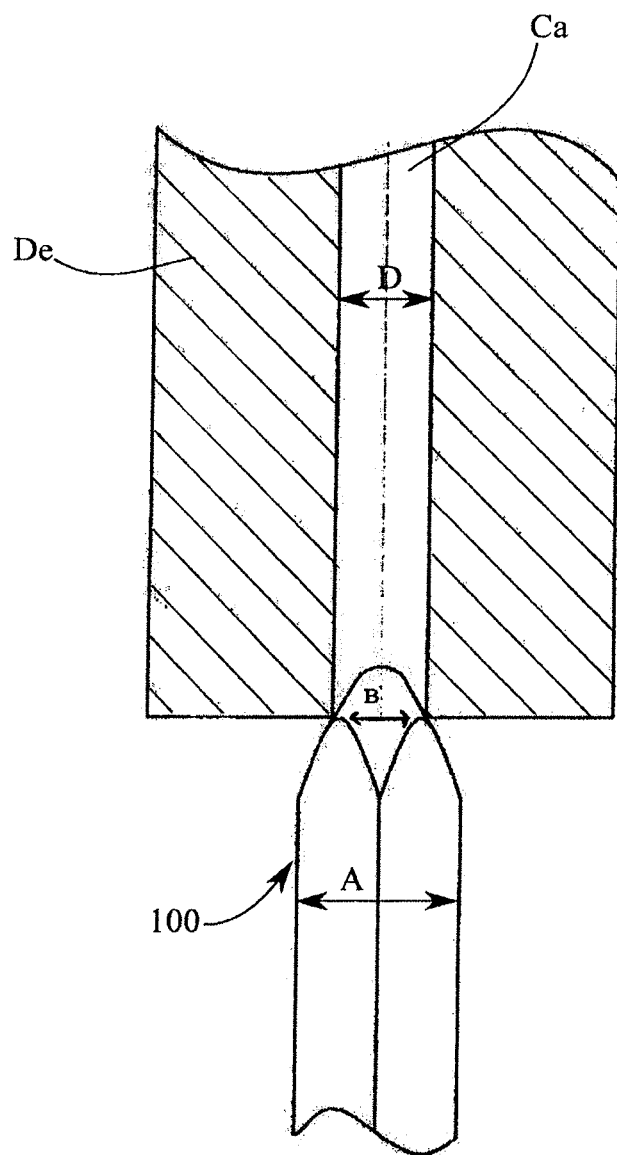
FIG. 3 shows a cross-sectional view illustrating the penetration of the instrument of the prior art according to FIG. 1, into a root canal.
Figure 4:
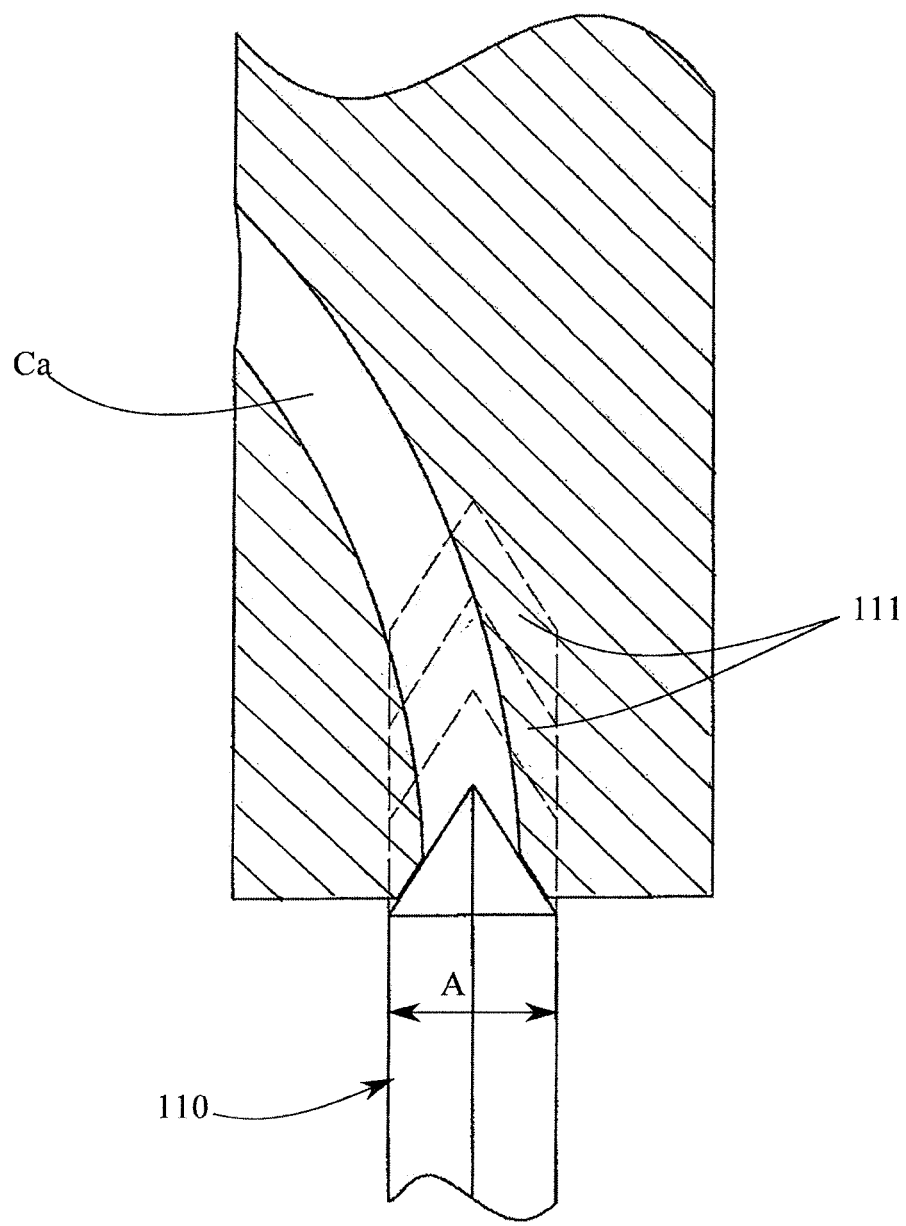
FIG. 4 shows a cross-sectional view illustrating the penetration of the instrument of the prior art according to FIG. 2, into a root canal.

The disadvantages of instruments of that type are illustrated in part by FIGS. 3 and 4. FIG. 3 shows an instrument 100 with a blunt tip that the practitioner wants to insert into a root canal Ca of a tooth De. The nominal diameter of the tip is A, the actual optimum cutting diameter is B and the initial diameter of the tooth canal is D. The main limitation of this type of tip is that it cannot machine a canal if there is too large a difference between the nominal diameter A of the instrument and the initial diameter D of the tooth canal. For example, if the nominal diameter A of the tip is 0.40 mm, the actual optimum cutting effect B is obtained at about 0.35 mm. This means that if the tooth canal has an initial diameter D of 0.10 mm, which corresponds approximately to the view shown in FIG. 3, the practitioner will have to stagger the work of machining the canal by using instruments with successive nominal diameters of 0.10 mm; 0.15 mm; 0.20 mm; 0.25 mm; 0.30 mm; 0.35 mm; and 0.40 mm. That represents a sequence of six instruments.

In practice users tend to "skip" some instruments, for example passing directly from the instrument with nominal diameter 0.30 mm to the instrument with nominal diameter 0.40 mm, doing this in order to gain time by simplifying the procedure. However, that "skipping" is done to the detriment of safety due to the risk of breaking off the tip, knowing also that the instrument can no longer work in an optimum way.

Instruments 110 of the type shown in FIG. 2 are known as instruments with an active tip and make it possible, thanks to a cutting effect at the center, to penetrate into a canal of very small size. It should be noted that these so-termed active tips should only be used for reprocessing operations in the straight part of a canal. FIG. 4 illustrates an application of an instrument 110 in a curved root canal Ca which has an initial section substantially smaller than the nominal diameter A of the instrument. It can be seen that the tip of the instrument 110 follows its straight trajectory in the direction of its longitudinal axis without conforming to the curve of the canal Ca, in such manner that its tip pierces the walls of the canal as shown by the positions 111 of the tip of the instrument 110. It is imperative for the perforation of the canal wall Ca to be avoided during a treatment, and that is why the use of this type of instrument entails risks for the patient.

Figure 5A:
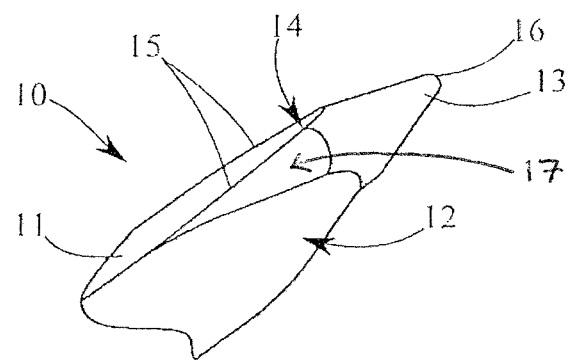
FIGS. 5A, 5B and 5C show a perspective view, a longitudinal section and a transverse cross-section of a preferred embodiment of an instrument according to the invention.
Figure 5B:
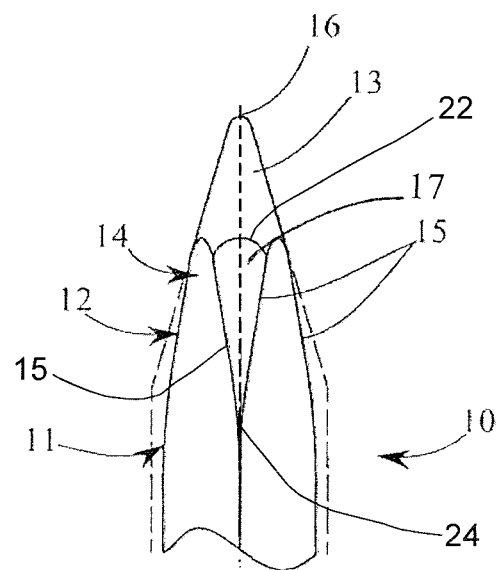
Figure 5C:
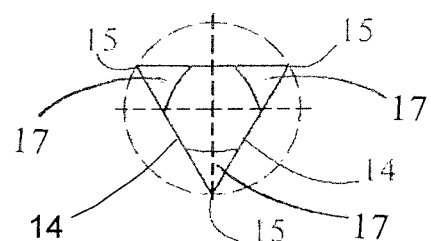

FIGS. 5A, 5B and 5C show a first embodiment, considered to be the preferred form of an instrument 10 according to the invention, which has a working section 11 that terminates in an end zone 12 having an end with the general shape of a conical tip. The end zone 12 has on the one hand a end section called the guiding section 13 which terminates in a rounded or blunt tip, and on the other hand at least one sharp section called the cutting section 14 arranged behind the guiding section 13. The cutting section 14 has at least one cutting edge 15, preferably a number of cutting edges 15, and is positioned between the guiding section 13 and the working section 11. A recessed junction zone 17 is located behind the guiding section 13 and in front of the working section 11. The recessed junction zone 17 has an edge 22 located at an upper axial end thereof as well as an axially opposite lower axial end 24. The end zone 12 has an apex angle between 10° and 60°. The cutting section 14 can have a cross-section that increases progressively from the base of the guiding section 13, over at least part of its length, toward the working section 11 of the instrument 10.

In the example shown, there are three cutting edges 15 equally distributed around the periphery of the instrument 10. The cross-section in FIG. 5C shows the cutting edges 15 arranged at the apexes of an equilateral triangle. It can be seen that the tip 16 of the instrument is blunt, with a rounded profile, which enables the instrument to perform a guiding function that allows it to follow the line of the root canal whatever its shape and in particular its curvature, without perforating the natural walls and damaging the dentine.

Figure 6:
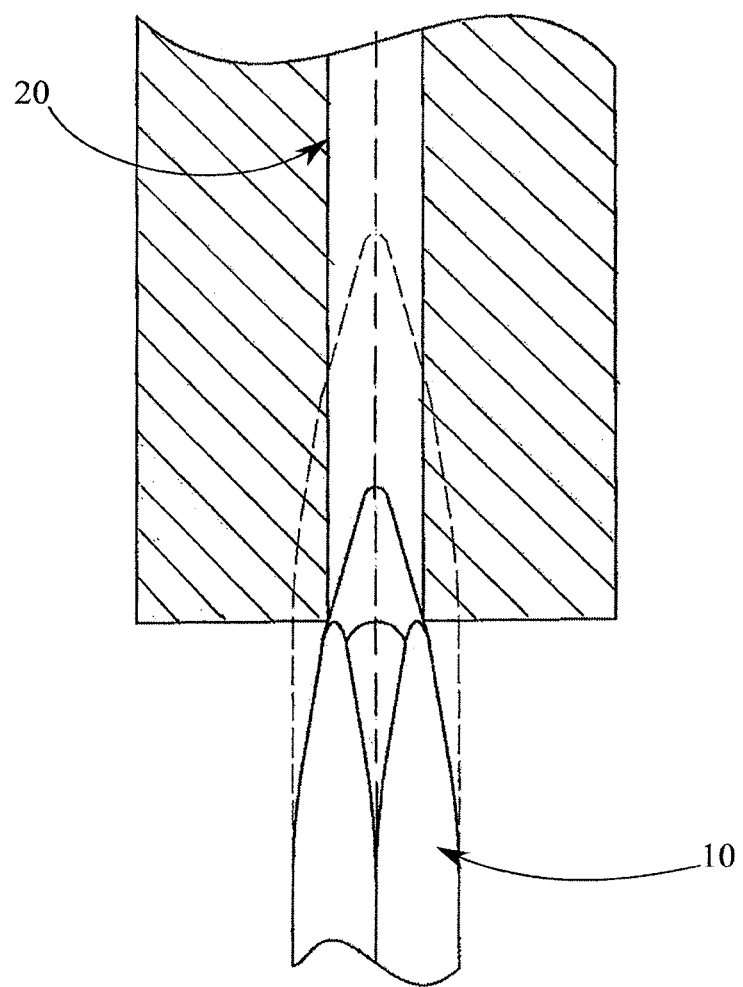
FIG. 6 shows a cross-sectional view illustrating the penetration of the instrument according to FIG. 5 into a straight root canal.
Figure 7:
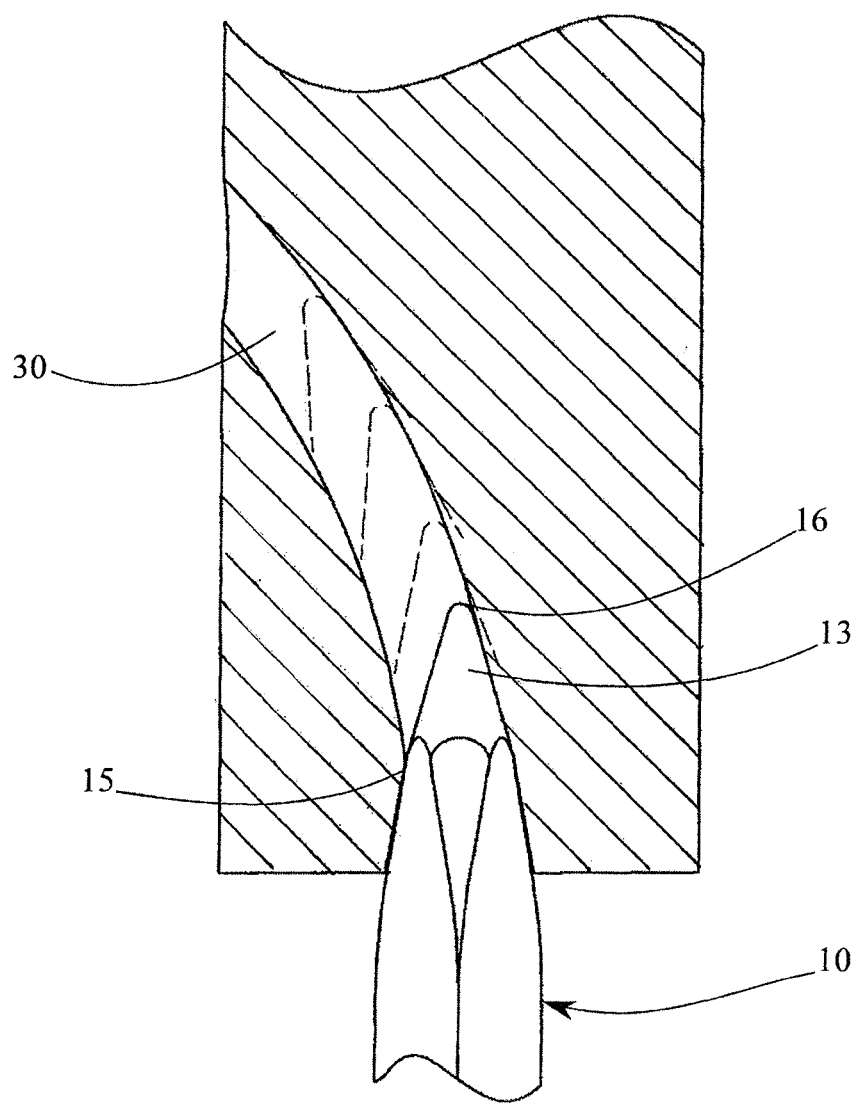
FIG. 7 shows a cross-sectional view illustrating the penetration of the instrument according to FIG. 5 into a curved root canal.

This penetration is illustrated schematically, into a straight canal in FIG. 6 and into a curved canal in FIG. 7. In the straight canal 20 the instrument is chosen such that its optimum cutting diameter corresponds to the initial diameter of the canal. The canal can be machined effectively and the widening of the canal takes place progressively until the nominal diameter of the instrument has been reached.

FIG. 7 illustrates the penetration of the tip of an instrument 10 according to the invention into a curved canal 30. By virtue of the blunt geometry of the tip 16 of the instrument 10, the instrument follows the curvature without risk of perforating the walls and boring out a second canal in the tooth, in the manner illustrated in FIG. 4 with an instrument of the prior art.

Figure 8A:
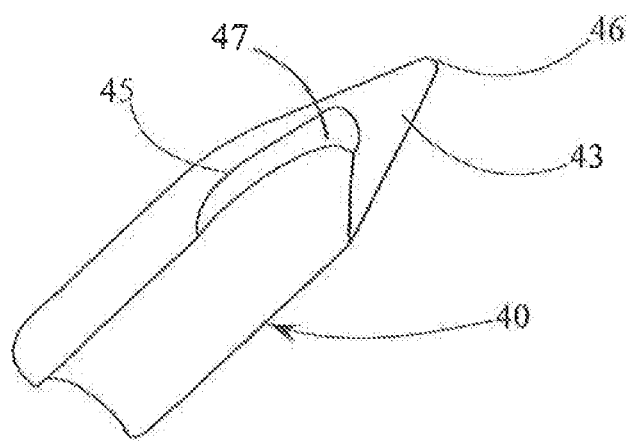
FIGS. 8A, 8B and 8C show a perspective view, a longitudinal section and a transverse cross-section of an embodiment variant of an instrument according to the invention.
Figure 8B:
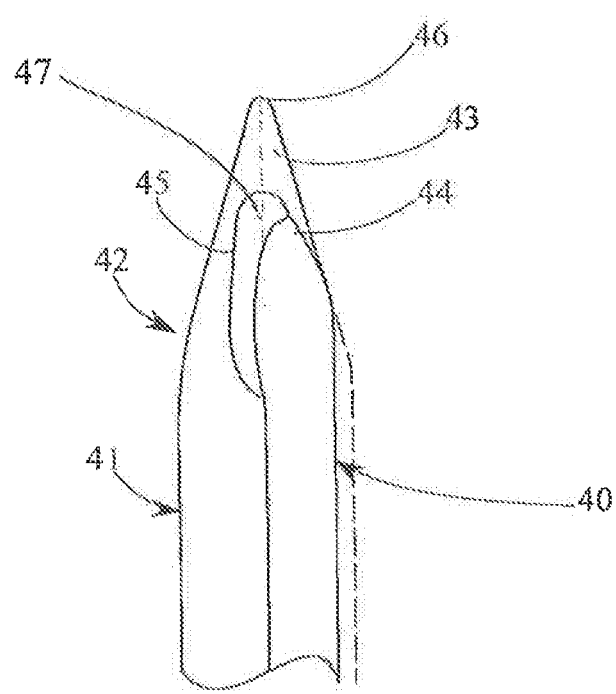
Figure 8C:
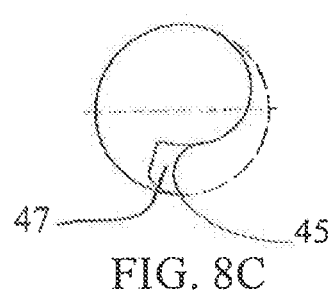

FIGS. 8A, 8B and 8C show an instrument 40 according to the invention, which differs from the instrument 10 shown in FIGS. 5A, 5B and 5C in that it has only one cutting edge 45 on its angular cutting section 44 and on its working section 41 that terminates in the end zone 42. The tip in the shape of a cone 46 is blunt. A junction zone 47 is located behind the guiding section 43 and in front of the working section 41.

Figure 9A:
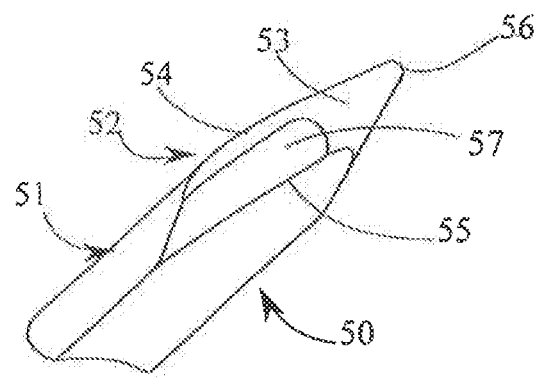
FIGS. 9A, 9B and 9C show a perspective view, a longitudinal section and a transverse cross-section of another embodiment variant of an instrument according to the invention.
Figure 9B:
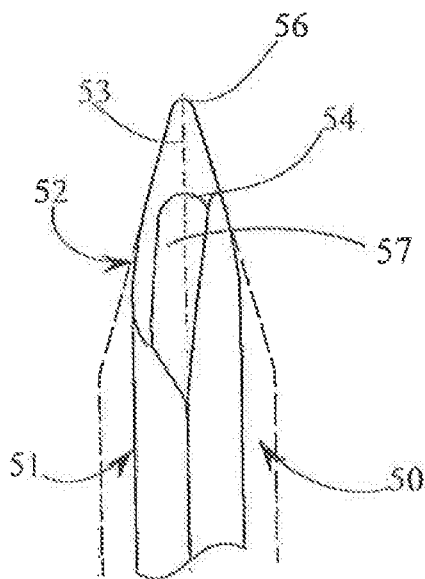
Figure 9C:
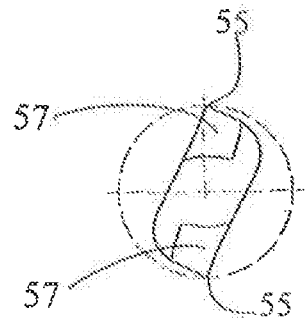

FIGS. 9A, 9B and 9C show an instrument 50 according to the invention, which differs from the instrument 10 shown in FIGS. 5A, 5B and 5C in that it has two cutting edges 55 on its angular cutting section 54 and on its working section 51 that terminates in the end zone 52. The tip in the shape of a cone 56 is blunt. The cutting edges 55 are arranged symmetrically relative to the longitudinal axis of the instrument. A junction zone 57 is located behind the guiding section 53 and in front of the working section 51.

Figure 10A:
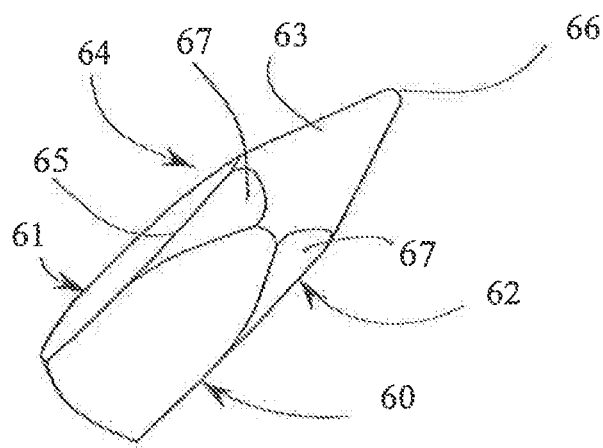
FIGS. 10A, 10B and 10C show a perspective view, a longitudinal section and a transverse cross-section of another embodiment variant of an instrument according to the invention.
Figure 10B:
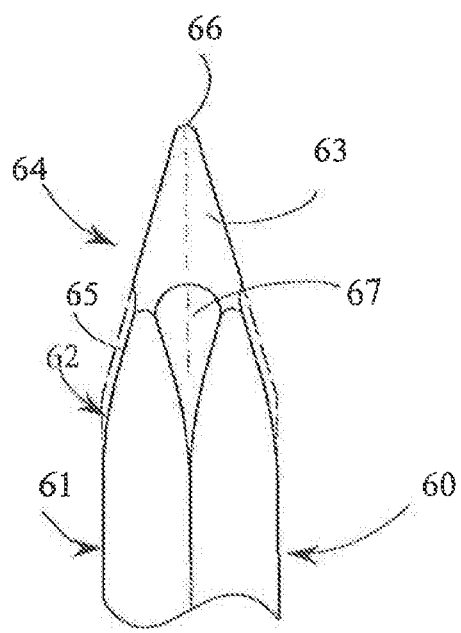
Figure 10C:
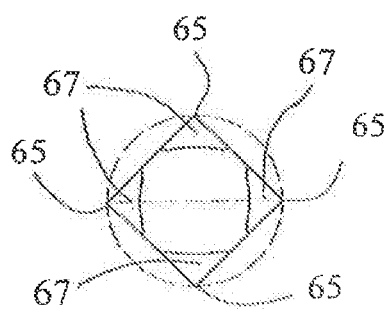

FIGS. 10A, 10B and 10C show an instrument 60 according to the invention, which differs from the instrument 10 as shown in FIGS. 5A, 5B and 5C in that it has four cutting edges 65 on its angular cutting section 64 and on its working section 61 that terminates in the end zone 62. The tip in the shape of a cone 66 is blunt. The cutting edges 65 are arranged two by two, symmetrically relative to the longitudinal axis of the instrument. A junction zone 67 is located behind the guiding section 63 and in front of the working section 61.

These different variants possess the same essential characteristics as those of the instrument shown in FIG. 5.

The present invention is not limited to the embodiments described, but can be modified or varied in ways that will be clear to those with knowledge of the field. The number of cutting edges can vary, the limit being set by the size of the instrument. The smaller the nominal diameter, the more difficult it will be to multiply the number of cutting edges.

The invention claimed is:

1. An endodontic instrument for reaming a root canal of a tooth of a patient, the instrument comprising:
   a working section (11) which terminates in an end zone (12), the working section and the end zone being located along a central longitudinal axis of the instrument, the end zone being conically shaped and having a dual function for both guiding the instrument via a guiding section (13), during movement thereof into the root canal, followed by cutting out organic material via a plurality of sharp cutting sections (14), the plurality of sharp cutting sections (14) being positioned behind the guiding section (13) and spaced a distance away from a rounded tip (16) of the guiding section, each of the plurality of sharp cutting sections (14) comprising a plurality of sharp cutting edges (15) in order to clean and prepare the root canal for subsequent treatment thereof,
   the guiding section (13) having a smooth wall having a conical surface that terminates at the rounded tip (16) at a leading end of the guiding section and a trailing end of the guiding section being defined by a fluted edge,
   the plurality of sharp cutting sections (14) and a plurality of recessed junction zones (17) each being located intermediate between the guiding section (13) and the working section (11), the plurality of sharp cutting sections (14) and the plurality of sharp cutting edges (15) being distributed about a periphery of the instrument, and each of the recessed junction zones (17) being located between a respective pair of the plurality of sharp cutting sections (14),
   each of the recessed junction zones comprising
      a leading end and sides, the leading end of the recessed junction zone being delimited by an arcuate section of the fluted edge (22) and the sides being delimited by the respective pair of the plurality of sharp cutting sections (14), the sides merge with one another at a point opposite the leading end of the recessed junction zone, and the fluted edge is formed by the recessed junction zones and the sharp cutting sections alternately distributed around the periphery of the instrument, the plurality of sharp cutting edges being spaced a distance away from the rounded tip (16) to avoid perforating walls of a natural canal and hollowing out a secondary canal which does not correspond to the natural canal and being symmetrical about the central longitudinal axis of the instrument from a lateral point of view and when viewed along the central longitudinal axis of the instrument.

2. The endodontic instrument according to claim 1, wherein the smooth wall of the guiding section, being conically shaped, has an apex angle that is between 10° and 60° relative to the central longitudinal axis.

3. The endodontic instrument according to claim 1, wherein at least one of the plurality of sharp cutting edges (15) of each of the plurality of sharp cutting sections (14) form an angle of between 10° and 60° relative to the central longitudinal axis of the instrument over at least part of the sharp cutting section (14).

4. The endodontic instrument according to claim 3, wherein an apex angle of the smooth wall of the guiding section (13) relative to the central longitudinal axis is larger than the angle formed by the sharp cutting edges (15) relative to the central longitudinal axis of the instrument (10).

5. The endodontic instrument according to claim 1, wherein a nominal diameter of the instrument, defined as a diameter of the working section (11), is larger than an effective cutting diameter, defined as a diameter located where the plurality of sharp cutting edges extend axially along the recessed junction zones (17) between the trailing end of the guiding section (13) and the plurality of sharp cutting sections (14).

6. The endodontic instrument according to claim 5, wherein the effective cutting diameter is equal to 0.10 mm.

7. The endodontic instrument according to claim 5, wherein the plurality of sharp cutting edges (65), when viewed in cross-section, are respectively positioned at six points along an equilateral triangle.

8. The endodontic instrument according to claim 5, wherein the plurality of sharp cutting edges (65), when viewed in cross-section, are respectively positioned at eight points along a square.

9. The endodontic instrument according to claim 1, wherein an angle of the smooth surface of the guiding section (13) is between 15° and 55°.

10. An endodontic instrument for reaming a root canal of a tooth of a patient, the instrument comprising:

a working section (11) which terminates in an end zone (12), the working section and the end zone being located along a central longitudinal axis of the instrument, the end zone being conically shaped and having a guiding section for guiding the instrument, via the guiding section (13), during movement of the end zone into the root canal, and a plurality of sharp cutting sections (14), the plurality of sharp cutting sections (14), being positioned behind the guiding section (13) and spaced a distance away from a rounded tip (16) of the guiding section, and each of the plurality of sharp cutting sections comprising at least one sharp cutting edge (15) in order to clean and prepare the root canal for subsequent treatment thereof;

the guiding section (13) having a smooth wall having a conical surface that terminates at the rounded tip (16) at a leading end of the guiding section and a trailing end of the guiding section being defined by a fluted edge, the plurality of sharp cutting sections (14) and a plurality of recessed junction zones (17) each being located intermediate between the guiding section (13) and the working section (11), the plurality of sharp cutting sections (14) and the sharp cutting edges (15) are distributed about a periphery of the instrument, each of the plurality of recessed junction zones comprising:

a leading end, sides and a trailing end, the leading end being adjacent the guiding section and the trailing end being adjacent the working section, the leading end of is delimited by an arcuate section of the fluted edge (22) and the sides are delimited by two of the plurality of sharp cutting sections (14) that are adjacent, and the sides respectively merge with one another at a point at the trailing end, and the fluted edge of the guiding section is formed by the plurality of recessed junction zones and the plurality of sharp cutting sections which are alternately distributed about the periphery of the instrument, the plurality of sharp cutting edges are spaced away from the rounded tip (16) to avoid perforating walls of a natural canal and hollowing out a secondary canal which does not correspond to the natural canal and being symmetrical about the central longitudinal axis of the instrument from a lateral point of view and when viewed along the central longitudinal axis of the instrument.

* * * * *